(12) United States Patent
Sato et al.

(10) Patent No.: US 9,239,390 B2
(45) Date of Patent: Jan. 19, 2016

(54) RADIATION IMAGING APPARATUS AND RADIATION IMAGING SYSTEM

(71) Applicant: CANON KABUSHIKI KAISHA, Tokyo (JP)

(72) Inventors: Sho Sato, Saitama (JP); Toshio Kameshima, Kumagaya (JP); Tomoyuki Yagi, Honjo (JP); Katsuro Takenaka, Honjo (JP); Hideyuki Okada, Honjo (JP); Atsushi Iwashita, Honjo (JP); Eriko Sugawara, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 14/010,406

(22) Filed: Aug. 26, 2013

(65) Prior Publication Data

US 2014/0061494 A1    Mar. 6, 2014

(30) Foreign Application Priority Data

Aug. 31, 2012 (JP) ................. 2012-192414

(51) Int. Cl.
*G01T 1/16* (2006.01)
*H04N 5/32* (2006.01)

(52) U.S. Cl.
CPC ... *G01T 1/16* (2013.01); *H04N 5/32* (2013.01)

(58) Field of Classification Search
CPC ............... G01T 1/16; H01L 27/14601; H01L 27/14643; H01L 31/02322; H01L 31/085; H04N 5/3696
See application file for complete search history.

(56) References Cited

U.S. PATENT DOCUMENTS

| 2004/0099792 A1* | 5/2004 | Ducourant ........... H04N 3/1512 250/214 R |
| 2012/0001079 A1* | 1/2012 | Okada ...................... H04N 5/32 250/366 |
| 2012/0097860 A1 | 4/2012 | Oguma |
| 2012/0199751 A1* | 8/2012 | Watanabe ............... H04N 5/32 250/370.09 |
| 2014/0061496 A1 | 3/2014 | Nakatsugawa et al. |
| 2014/0110595 A1* | 4/2014 | Iwakiri ............... A61B 6/4233 250/394 |

FOREIGN PATENT DOCUMENTS

| JP | H11-151233 A | 6/1999 |
| JP | 2010-268171 A | 11/2010 |
| WO | 2012/056899 A1 | 5/2012 |

OTHER PUBLICATIONS

European Search Report issued in corresponding application No. 13182135.7 on Mar. 12, 2015.

* cited by examiner

*Primary Examiner* — Casey Bryant
(74) *Attorney, Agent, or Firm* — Carter, DeLuca, Farrell & Schmidt, LLP

(57) ABSTRACT

A radiation imaging apparatus including: a detector that includes a detection section in which pixels having a conversion element that converts radiation to an electric charge are arranged in a matrix shape, a drive circuit configured to drive the detection section, and a read circuit configured to output an electric signal that corresponds to the electric charge as image data; a radiation detection unit configured to detect a radiation irradiation state using two detection units that are adjacently arranged in the detection section; and a control unit configured to control operations of the drive circuit and the read circuit in accordance with a detection result obtained by the radiation detection unit, wherein a detection capability by one of the detection units is set to a lower capability than a detection capability at by the other of the detection units.

10 Claims, 8 Drawing Sheets

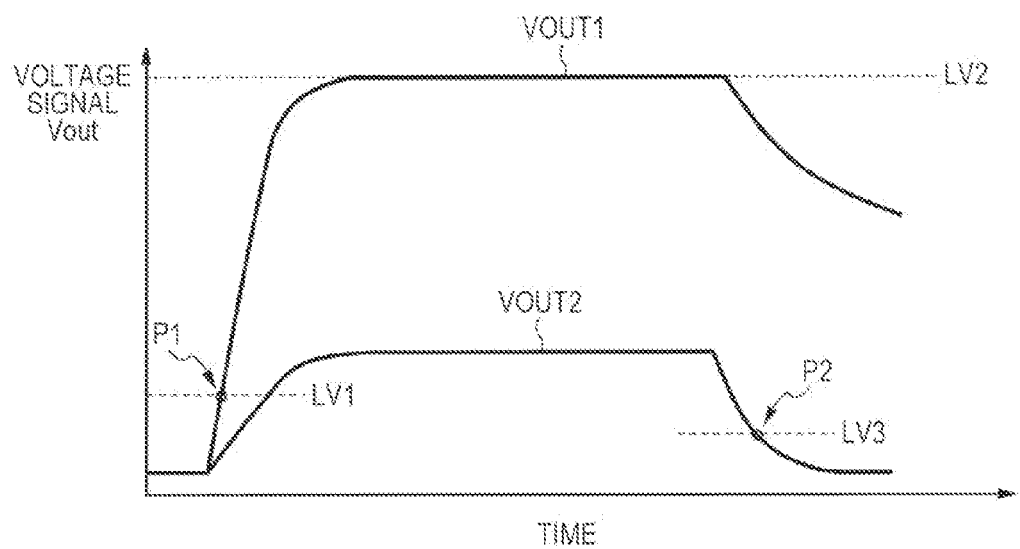

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

In recent years, radiation imaging apparatuses including a flat panel detector (hereinafter abbreviated as "FPD") formed of a semiconductor material have started to be put to practical use as radiation imaging apparatuses that used for medical diagnostic imaging or a nondestructive inspection using an X-ray. In an FPD, a plurality of pixels having conversion elements constructed using semiconductor material such as a-Si that is capable of converting radiation into electric charges and switching elements that transfer electric signals that correspond to the electric charges are arranged two-dimensionally. Such radiation imaging apparatuses including an FPD are used, for example, in medical diagnostic imaging as digital imaging apparatuses for still image radiographing like general radiographing or moving image radiographing such as fluoroscopic radiographing.

When performing radiographing, a radiation imaging apparatus performs radiographing in synchrony with the operations of a radiation generating apparatus. As synchronization methods, for example, a method is available in which the radiation generating apparatus and the radiation imaging apparatus are synchronized by electrically connecting the two apparatuses to each other, or a method is available in which the radiation imaging apparatus is synchronized with the radiation generating apparatus by detecting radiation that is radiated from the radiation generating apparatus. In the former case, because service personnel connect the radiation generating apparatus and the radiation imaging apparatus with a cable, the connection work involves time and labor, and furthermore the radiation generating apparatus and the radiation imaging apparatus must be fixed and used as a single pair of apparatuses. In the latter case, a method is known in which a radiation detector is provided inside and outside the radiation imaging apparatus, or in which the radiation imaging apparatus itself performs detection of radiation. In this case, there is the advantage that time and labor for connection work are not required, and the radiation imaging apparatus is portable and can be used in combination with various radiation generating apparatuses.

Normally, in an FPD, pixels that include a photoelectric conversion element and a switching element are two-dimensionally arrayed, and reading of signals from the photoelectric conversion elements and resetting of the photoelectric conversion elements is performed in row units. Before radiation is irradiated, the switching elements are subjected to on/off control in row units, and a dark current component flowing to the photoelectric conversion elements is reset. Hereunder, this operation is referred to as an "initializing operation". If a radiation irradiation signal is received or radiation is detected during an initializing operation, it is necessary to immediately end the operation to reset the photoelectric conversion elements and transition to an accumulation operation. If a transition is not made to the accumulation operation even though a radiation irradiation signal has been received, a time lag will arise between the time that the user pushed the exposure button and the actual photographed image, and an unintended image in which a difference in level or the like arises will be obtained. Further, if an initializing operation is continued even though radiation was detected, since radiation signals that are generated at the photoelectric conversion elements will be reset, unnecessary radiation will have been irradiated at the subject and the amount of radiation exposure may increase.

Japanese Patent Application Laid-Open No. H11-151233 discloses technology that includes a radiation detection unit and that controls operations of a radiation imaging apparatus based on a signal from the radiation detection unit. For example, when the start of irradiation of radiation is determined based on a signal from the radiation detection unit, the operating state of a radiation imaging unit immediately shifts from a radiographing preparation state to an accumulation state, and when the end of irradiation of radiation is determined thereafter, the operating state of the radiation imaging unit immediately shifts from the accumulation state to an image data output state. Further, Japanese Patent Application Laid-Open No. 2010-268171 discloses technology that detects a current that flows through a bias wire that supplies a bias voltage to a radiation detecting element to control the operations of a radiation imaging apparatus. However, with the technology disclosed in Japanese Patent Application Laid-Open No. H11-151233, in some cases it is not possible for the radiation detection unit to adapt to various radiographing kinds (the radiographing site and the build of a subject, a moving image or a still image radiographing mode and the like), and sometimes the radiation detection unit can not accurately detect both the start and end of radiation exposure. Therefore, a radiation detection unit is demanded that is capable of accurately detecting both the start and end of irradiation of radiation with respect to various irradiation conditions.

SUMMARY OF THE INVENTION

An object of the present invention is to provide a radiation imaging apparatus that enables more favorable radiation detection.

The present invention provides a radiation imaging apparatus that comprises:

a detector including a detection section in which pixels having a conversion element that converts radiation into an electric charge are arranged in a matrix shape, a drive circuit configured to drive the detection section to output electric signals that correspond to the electric charges from the pixels, and a read circuit configured to output the electric signals as image data;

a radiation detection unit configured to detect an irradiation state of radiation using two detection units that are adjacently arranged in the detection section; and a control unit configured to control operations of the drive circuit and the read circuit in accordance with a detection result obtained by the radiation detection unit, wherein, in the radiation detection unit, a detection capability by one of the detection units is set to a lower capability than a detection capability by the other of the detection units.

According to the present invention, it is possible to provide a radiation imaging apparatus that can accurately detect radiation with respect to various irradiation conditions to enable more favorable radiation detection.

Further features of the present invention will become apparent from the following description of exemplary embodiments with reference to the attached drawings.

BRIEF DESCRIPTION OF THE DRAWINGS

FIG. 6 is a conceptual diagram that illustrates an example of voltage values that are output from current detection units connected to two adjacent radiation detection sensors, respectively.

FIG. 7 is a view illustrating an example of a gain setting table according to the first embodiment.

DESCRIPTION OF THE EMBODIMENTS

Preferred embodiments of the present invention will now be described in detail in accordance with the accompanying drawings.

Embodiments of the present invention are described hereunder based on the accompanying drawings. Note that the term "radiation" as used with respect to the present invention refers not only to alpha rays, beta rays, and gamma rays which are generated by particles (including photons) emitted due to radioactive decay, but also includes beams having energy equal to or greater than the aforementioned rays, for example, X-rays, particle beams, and cosmic rays.

First Embodiment

Figure 1:
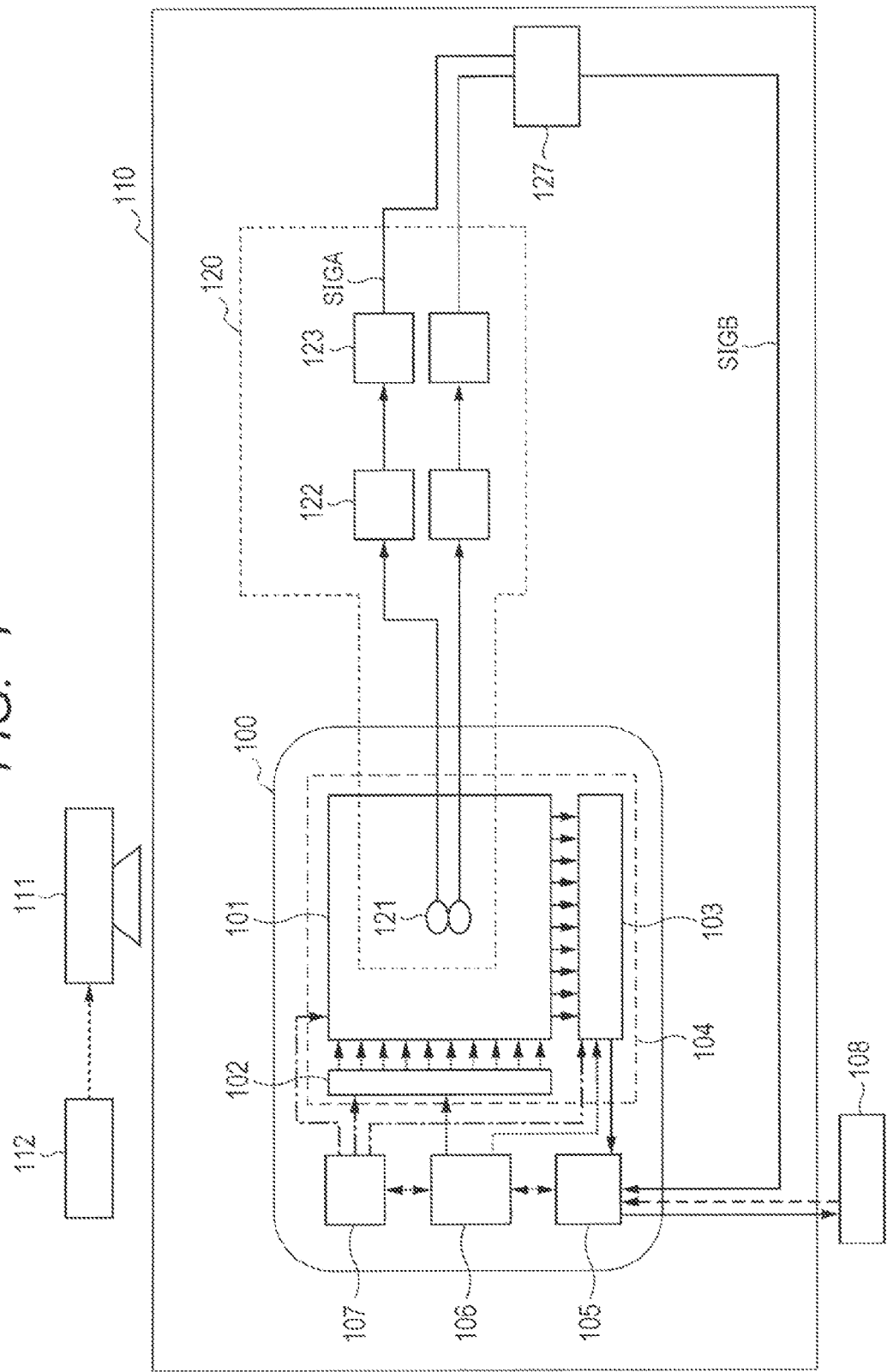
FIG. 1 is a view that illustrates a configuration example of a radiation imaging apparatus according to a first embodiment.

A first embodiment of the present invention will now be described. FIG. 1 is a block diagram that illustrates a configuration example of a radiation imaging apparatus according to the first embodiment. Note that, in addition to a radiation imaging apparatus 110 according to the first embodiment, FIG. 1 also illustrates a radiation generating apparatus 111 and a control console 112. In the present embodiment, the radiation imaging apparatus 110 and the radiation generating apparatus 111 are not electrically connected, and there is no exchange of signals therebetween. The radiation generating apparatus 111 irradiates radiation in accordance with radiation irradiation conditions received from the control console 112.

The radiation imaging apparatus 110 includes an imaging apparatus 100, a radiation detection unit 120, and a determination unit 127. The imaging apparatus 100 includes a detector (FPD) 104 having a detection unit 101 including a plurality of pixels that convert radiation into electric signals, a drive circuit 102 that drives the detection unit 101, and a read circuit 103 that outputs electric signals from the detection unit 101 as image data. The imaging apparatus 100 further includes a signal processing unit 105 that processes the image data from the FPD 104 and that outputs the resulting data, a control unit 106 that controls operations of the FPD 104 by supplying respective control signals to each of the components, and a power supply unit 107 that supplies a bias to each of the components, respectively. The signal processing unit 105 receives a control signal transmitted from a control computer 108, and provides the control signal to the control unit 106. The signal processing unit 105 also receives information regarding the potential of a signal line that is transmitted from the read circuit 103 during a period in which radiation is irradiated, and transmits the information to the control computer 108. The power supply unit 107 includes a power supply circuit such as a regulator that receives a voltage transmitted from an unshown external power supply or internal battery, and that supplies required voltages to the detection unit 101, the drive circuit 102, and the read circuit 103.

The radiation detection unit 120 includes a radiation detection sensor 121, a current detection unit 122, and a comparison unit 123, and detects a radiation irradiation state in the detection unit 101. The radiation detection sensor 121 converts irradiated radiation into a current signal. The current detection unit 122 detects the current signal from the radiation detection sensor 121 and converts the current signal into a voltage signal. The comparison unit 123 compares the voltage signal from the current detection unit 122 and a threshold voltage, and outputs the comparison result by a signal SIGA. In the present embodiment, the single set of radiation detection sensors 121 that includes two adjacent radiation detection sensors 121 is arranged inside the detection unit 101, and a current detection unit 122 is connected to each of the radiation detection sensors 121, respectively. The determination unit 127 receives the signal SIGA from each comparison unit 123 of the radiation detection unit 120, determines the radiation irradiation state, and outputs the determination result as a radiation detection signal SIGB.

Note that although the radiation detection sensors 121 are arranged on a radiation irradiation face of the detection unit 101 according to the present embodiment, the radiation detection sensors 121 may be arranged on the opposite side of the radiation irradiation face. Further, to enable reliable detection of radiation irradiation even if a radiation irradiation region is narrowed, it is desirable that a radiation detection sensor 121 is arranged at a center part in the detection unit. According to the present embodiment, a direct-type sensor that converts radiation directly into an electric signal or a sensor formed by coating a fluorescent substance that converts radiation into visible rays on an Si photodiode may be used as the radiation detection sensor 121. However, the present invention is not limited to such sensors, and the radiation detection sensor may be a component that includes one part of wiring included in the detection unit 101 and obtains a signal that detects a radiation irradiation state from a predetermined region of the detection unit 101.

Figure 2:
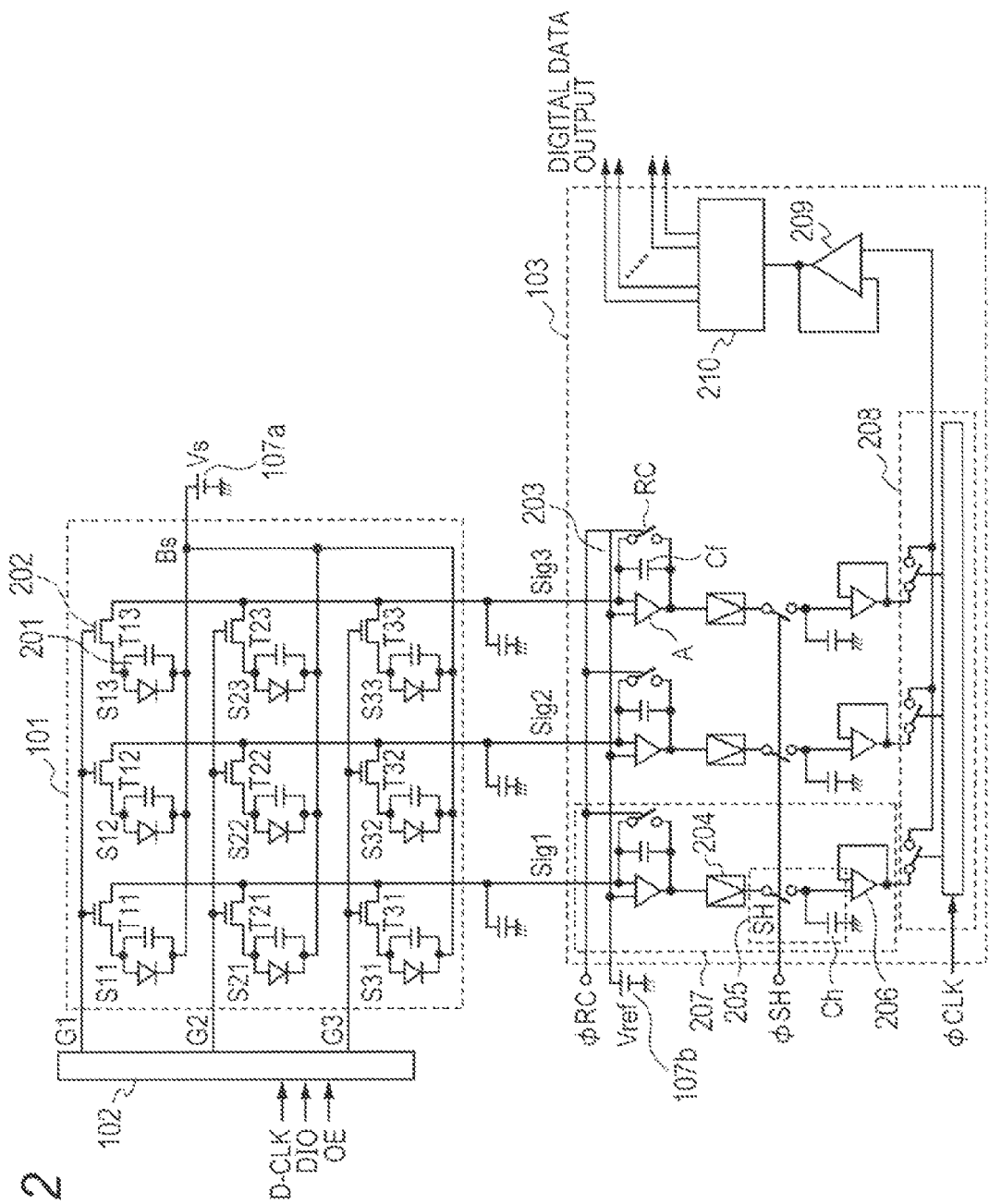
FIG. 2 is a view that illustrates a configuration example of an imaging apparatus according to the first embodiment.

Next, the imaging apparatus according to the first embodiment is described using FIG. 2. Elements in FIG. 2 having the same configuration as that described with reference to FIG. 1 are assigned the same reference numerals, and detailed descriptions thereof are omitted. Further, in FIG. 2, an imaging apparatus including an FPD having pixels of three rows by three columns is illustrated for ease of description. In actuality, however, an imaging apparatus has a larger number of pixels. For example, a 17-inch imaging apparatus has pixels of approximately 2800 rows by approximately 2800 columns.

The detection unit 101 has a plurality of pixels arranged in a matrix. In the present embodiment, each of the pixels has a conversion element 201 that converts radiation into an electric charge, and a switching element 202 that outputs an electric signal corresponding to the electric charge. In the present embodiment, a metal-insulator-semiconductor (MIS)-type photosensor that is provided on an insulating substrate such as a glass substrate and that includes amorphous silicon as the main material is used as a photoelectric conversion element which converts light into an electric charge. An indirect-type conversion element having a wavelength converter that is provided on the side on which radiation is incident of the above-described photoelectric conversion element and that converts radiation into light falling within the band of wavelengths that can be sensed by the photoelectric conversion element, or a direct-type conversion element that directly converts radiation into an electric charge is suitably used as the conversion element. A transistor having a control terminal and two main terminals is suitably used as the switching element 202. In the present embodiment, a thin film transistor (TFT) is used. One of the electrodes of the conversion element 201 is electrically connected to one of the two main terminals of the switching element 202, and the other electrode is electrically connected to a bias power supply 107a via a common bias line Bs.

A plurality of switch elements in the row direction, for example, switching elements T11, T12, and T13, have control terminals that are commonly electrically connected to a drive line G1 of the first row, and drive signals for controlling the conductive state of the switching elements are applied from the drive circuit 102 via drive lines on a row-by-row basis. In a plurality of switching elements in the column direction, for example, switching elements T11, T21, and T31, the other main terminals thereof are electrically connected to a signal line Sig1 of the first column, and electric signals corresponding to the electric charge of the conversion elements are output to the read circuit 103 via signal lines during a period in which the switching elements are in a conductive state. A plurality of signal lines Sig1 to Sig3 arranged in the column direction carry the electric signals output from the plurality of pixels to the read circuit 103 in parallel.

Although each of the pixels described in the present embodiment includes the conversion element 201 and the switching element 202, the present embodiment is not limited thereto. The present embodiment also includes a pixel that further includes at least an amplification transistor between the signal line Sig or conversion element 201 and the switching element 202, or a pixel that further includes an initialization transistor that initializes the conversion element 201 or a node provided between the conversion element 201 and the amplification transistor.

The read circuit 103 includes a plurality of amplifier circuits 207 that amplify the electric signals output in parallel from the detection unit 101, that are provided in correspondence with the respective signal lines. Further, each amplifier circuit 207 includes an integrating amplifier 203 that amplifies an output electric signal, a variable amplifier 204 that amplifies an electric signal from the integrating amplifier 203, a sample and hold circuit 205 that samples and holds the amplified electric signal, and a buffer amplifier 206.

The integrating amplifier 203 has an operational amplifier A that amplifies a read electric signal and that outputs the amplified signal, an integrating capacitor Cf, and a reset switch RC. The integrating amplifier 203 includes a mechanism that is capable of changing an amplification factor by changing the value of the integrating capacitor Cf. An output electric signal is input to an inverting input terminal of the operational amplifier A, a reference voltage Vref is input from a reference power supply 107b to a non-inverting input terminal of the operational amplifier A, and an amplified electric signal is output from an output terminal of the operational amplifier A. Further, the integrating capacitor Cf is arranged between the inverting input terminal and the output terminal of the operational amplifier A.

The sample and hold circuit 205 is provided in correspondence with each amplifier circuit 207, and is constituted by a sampling switch SH and a sampling capacitor Ch. Further, the read circuit 103 includes a multiplexer 208 that sequentially outputs electric signals read in parallel from the respective amplifier circuits 207 and that outputs the electric signals as serial image signals, and a buffer amplifier 209 that performs impedance conversion on the image signals and outputs the converted image signals. An image signal that is an analog electric signal output from the buffer amplifier 209 is converted into digital image data by an A/D converter 210 and is then output to the signal processing unit 105 illustrated in FIG. 1. Image data that is processed by the signal processing unit 105 is output to the control computer 108.

The drive circuit 102 outputs drive signals having a conductive voltage Vcom for bringing a switching element into a conductive state and a non-conductive voltage Vss for bringing a switching element into a non-conductive state in accordance with control signals (D-CLK, OE, DIO) input from the control unit 106 to the respective drive lines. Thus, the drive circuit 102 controls the conductive state and the non-conductive state of the switching elements, and drives the detection unit 101.

The power supply unit 107 illustrated in FIG. 1 includes the bias power supply 107a and the reference power supply 107b of the amplifier circuits 207 that are illustrated in FIG. 2. The bias power supply 107a commonly supplies a bias voltage Vs to the other electrode of each conversion element via the bias line Bs. The reference power supply 107b supplies the reference voltage Vref to the non-inverting input terminal of each operational amplifier.

The control unit 106 illustrated in FIG. 1 controls the operation of the FPD 104 by receiving a control signal from the control computer 108 or the like outside the apparatus via the signal processing unit 105 and supplying various control signals to the drive circuit 102, the power supply unit 107, and the read circuit 103. The control unit 106 illustrated in FIG. 1 controls the operation of the drive circuit 102 illustrated in FIG. 2 by supplying a control signal D-CLK, a control signal OE, and a control signal DIO to the drive circuit 102. Here, the control signal D-CLK is a shift clock of a shift register used as a drive circuit, the control signal DIO is a pulse that starts a transfer operation of the shift register, and OE is a signal that controls an output terminal of the shift register. Further, the control unit 106 controls the operations of the respective components of the read circuit 103 by supplying a control signal $\Phi RC$, a control signal $\Phi SH$, and a control signal $\Phi CLK$ to the read circuit 103 illustrated in FIG. 2. Here, the control signal $\Phi RC$ controls the operations of the reset switches of the integrating amplifiers, the control signal $\Phi SH$ controls the operations of the sample and hold circuit 205, and the control signal $\Phi CLK$ controls the operation of the multiplexer 208.

Figure 3:
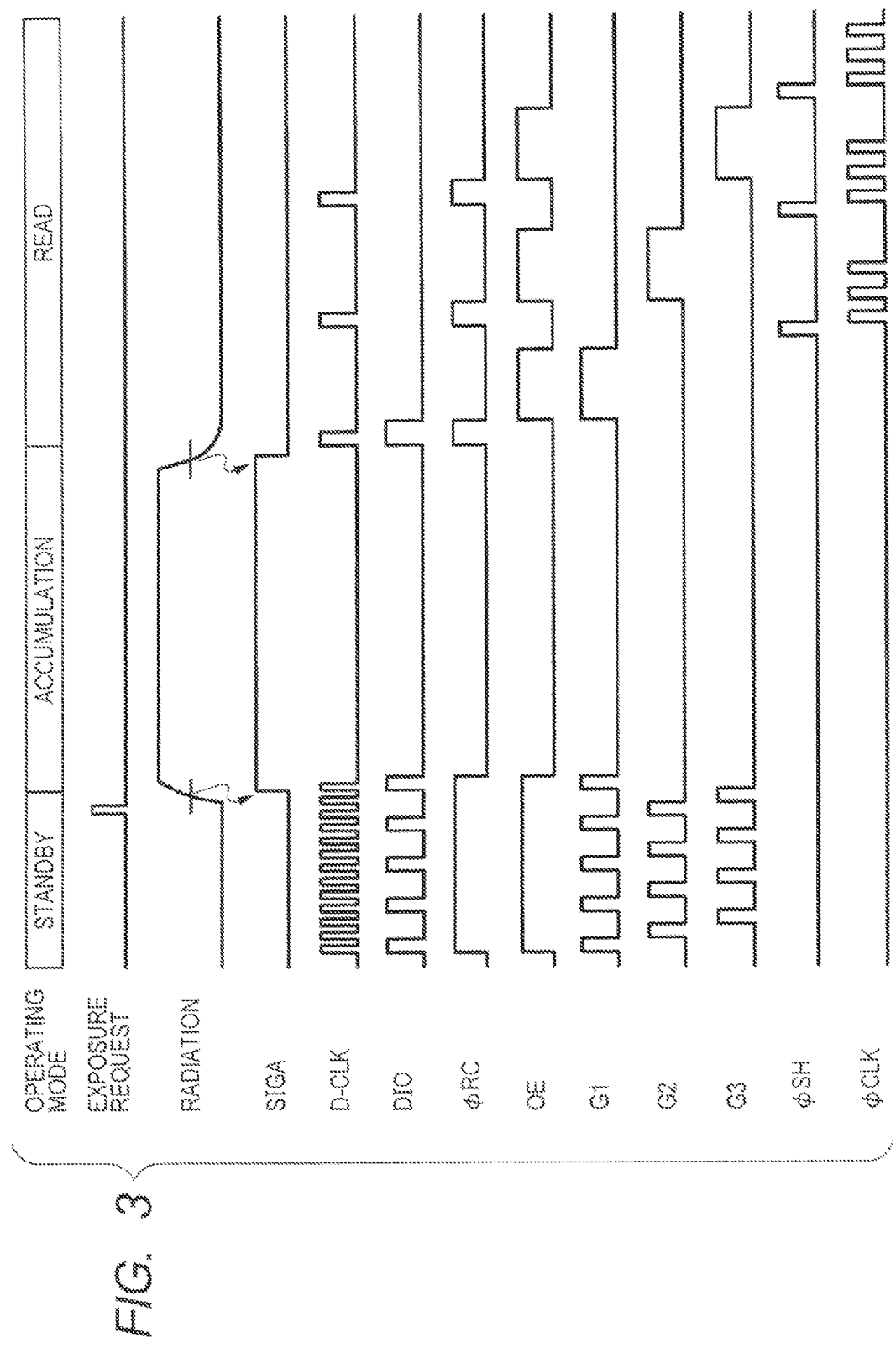
FIG. 3 is a timing chart illustrating an example of operations of the radiation imaging apparatus according to the first embodiment.

Next, the operations of the radiation imaging apparatus according to the first embodiment will be described with reference to FIGS. 1 to 3. First, when the power of the radiation imaging apparatus 110 is turned on, the bias voltage Vs is supplied to the conversion elements 201 of the imaging apparatus 100, and the imaging apparatus 100 enters a standby state. In the standby state, an initializing operation is repeatedly performed to reset a dark current that flows though the conversion elements S11 to S33. In the initializing operation, the control signal $\Phi RC$ is made a high level, and the integrating capacitor Cf of the integrating amplifiers 203 and the signal lines Sig are reset by the reset switch RC that is placed in a conductive state. Further, in synchrony with the control signal DIO and the control signal D-CLK that are sent to the drive circuit 102, the conductive voltage Vcom is applied to the drive line G1 to place the switching elements T11, T12, and T13 of the pixels in the first row in a conductive state. The conversion elements 201 are reset as a result of the switching elements entering a conductive state. The conversion elements 201 of all the pixels are reset by repeatedly performing control of the conductive state of the switching elements and resetting in this manner in sequence for the second row and third row. To continue the initializing operation, the control signal DIO is again sent to the drive circuit 102, and the conductive voltage Vcom is applied to the drive line G1 of the first row. The initializing operation is repeatedly performed in the above described manner while the imaging apparatus 100 is in the standby state.

When an exposure request signal is transmitted to the radiation generating apparatus 111 as a result of an operation by the operator at the control console 112, radiation irradiation is started immediately. When radiation is irradiated at the imaging apparatus 100, the radiation is also irradiated at the single set of radiation detection sensors 121 that includes two adjacent radiation detection sensors 121 of the radiation detection unit 120, and a detection result from the radiation detection unit 120 is input to the determination unit 127 by means of the radiation detection signal SIGA. The determination unit 127 determines the radiation irradiation state based on the radiation detection signal SIGA, and sends the radiation detection signal SIGB to the signal processing unit 105. Thus, when radiation irradiation is started, the start of irradiation of radiation is detected by the radiation detection unit 120, and a radiation detection signal SIGB that indicates the start of irradiation of radiation is sent to the signal processing unit 105 by the determination unit 127. Next, the signal processing unit 105 that received the radiation detection signal SIGB indicating the start of irradiation of radiation sends a signal to the control unit 106 to stop the initializing operation and transition the operating state from the standby state to an accumulation state. As a result, the imaging apparatus 100 transitions from the standby state to the accumulation state. During the period in which the imaging apparatus 100 is in the accumulation state, the non-conductive voltage Vss is applied to the switching elements 202 so that the switching elements of all pixels enter a non-conductive state.

Thereafter, when the radiation irradiation ends, the end of irradiation of radiation is detected by the radiation detection unit 120 having the single set of radiation detection sensors 121 that includes two adjacent radiation detection sensors 121, and a radiation detection signal SIGB that indicates the end of irradiation of radiation is sent to the signal processing unit 105 by the determination unit 127. Next, the signal processing unit 105 that received the radiation detection signal SIGB indicating the end of irradiation of radiation sends a signal to the control unit 106 to transition the operating state from the accumulation state to a read state. As a result, the imaging apparatus 100 transitions from the accumulation state to a read state. In the read state, an actual read operation is performed in which the read circuit 103 causes electric signals that correspond to electric charges accumulated in the conversion elements 201 to be outputted from the pixels, and outputs the signals as pixel data.

In the actual read operation, first the integrating capacitors Cf and the signal lines Sig are reset by the reset switch RC that is placed in a conductive state by making the control signal ΦRC a high level in a pulse shape. Next, the conductive voltage Vcom is applied to the drive line G1 of the first row from the drive circuit 102 to place the switching elements T11, T12, and T13 of the pixels in the first row in a conductive state. As a result, electric signals based on electric charges generated in the conversion elements S11 to S13 of the pixels in the first row are output to the respective signal lines. The electric signals that are output in parallel via the respective signal lines are amplified by the operational amplifier 203 and variable amplifier 204 of each amplifier circuit 207, respectively. The respective electric signals amplified by the operational amplifiers 203 and variable amplifiers 204 are held in parallel in the sample and hold circuits 205 of the respective amplifier circuits 207 by the sample and hold circuit 205 operating in response to the control signal ΦSH. After the signals are held in the sample and hold circuits 205, the control signal ΦRC is made a high level in a pulse shape to reset the integrating capacitors Cf and signal lines Sig. After resetting, similarly to the operations performed for the first row, the conductive voltage Vcom is applied to the drive line G2 of the second row from the drive circuit 102, and the switching elements T21, T22, and T23 of the pixels of the second row are placed in a conductive state. In the period in which the switching elements T21, T22, and T23 of the pixels of the second row are in the conductive state, the multiplexer 208 sequentially outputs the electric signals that are held in the sample and hold circuit 205. As a result, the electric signals from the pixels in the first row that were read in parallel are converted into serial image signals and output, and the A/D converter 210 converts the serial image signals into image data for one row and outputs the image data. By performing the above described operations in row units from the first row to the third row, image data for one frame is output from the imaging apparatus.

Figure 4:
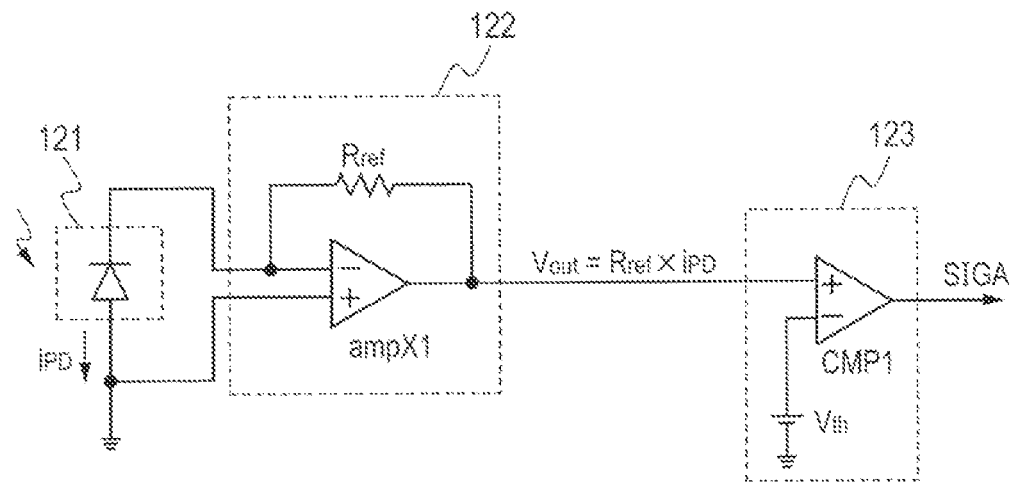
FIG. 4 is a view that illustrates a configuration example of a radiation detection unit according to the first embodiment.

Next, operations relating to radiation detection in the first embodiment are described using FIG. 4. FIG. 4 is a view that illustrates a configuration example of the radiation detection unit 120 according to the first embodiment. When radiation is irradiated at the radiation detection sensor 121, a current iPD that corresponds to an input amount of irradiated radiation flows to the radiation detection sensor 121. In addition, the current iPD also flows to a feedback resistance Rref that is connected between an inverting input terminal and an output terminal of an amplifier ampX1 of the current detection unit 122, and is subjected to current-voltage conversion by the amplifier ampX1 of the current detection unit 122. Here, a voltage value Vout that is output from the amplifier ampX1 is expressed as the product of the resistance value of the feedback resistance Rref and the current iPD. That is, the resistance value of the feedback resistance Rref corresponds to a gain of the amplifier ampX1, and a voltage value that is output from the amplifier ampX1 can be controlled by changing the resistance value of the feedback resistance Rref.

The voltage value Vout that is output from the amplifier ampX1 is input to a comparator CMP1 of the comparison unit 123 and compared with an arbitrary threshold voltage Vth. If the voltage value Vout that is output from the amplifier ampX1 exceeds the threshold voltage Vth when radiation is irradiated and a current flows to the radiation detection sensor 121, the comparator CMP1 sets the signal SIGA to the high level and outputs the signal SIGA to the determination unit 127. The determination unit 127 determines that radiation irradiation has started when either one of the signals SIGA that are output by the two comparison units 123 that respectively receive a signal from the single set of radiation detection sensors 121 that includes two adjacent radiation detection sensors 121 changes from a low level to a high level. Further, upon determining that radiation irradiation started, the determination unit 127 sends a radiation detection signal SIGB that indicates the start of irradiation of radiation to the signal processing unit 105. As a result the imaging apparatus 100 transitions to an accumulation operation.

Thereafter, when irradiation of radiation ends, the voltage value Vout that is output from the amplifier ampX1 becomes less than the threshold voltage Vth, and the comparator CMP1 sets the signal SIGA to the low level and outputs the signal SIGA to the determination unit 127. The determination unit 127 determines that radiation irradiation has ended when either one of the signals SIGA that are output by the two comparison units 123 changes from the high level to the low level. Further, upon determining that the radiation irradiation ended, the determination unit 127 outputs a radiation detection signal SIGB that indicates the end of irradiation of radiation. The radiation detection signal SIGB that indicates the end of irradiation of radiation is sent to the signal processing unit 105, and as a result the imaging apparatus 100 transitions to a read operation.

In the present embodiment, two radiation detection sensors 121 are adjacently arranged in the detection unit, and the gain of the current detection units 122 and the threshold voltages Vth of the comparison units 123 that correspond to the respective radiation detection sensors 121 are set differently to each other. For one of the two radiation detection sensors 121, the detection capability is set so that the radiation detection sensor 121 has a high detection capability, while for the other of the two radiation detection sensors 121, the detection capability is set so that the radiation detection sensor 121 has a low detection capability. In this case, in the current detection unit 122, the resistance value of the feedback resistance Rref is set so that an output voltage of the amplifier ampX1 remains within a dynamic range in which the amplifier ampX1 operates normally. Normally, based on the relation Vout=Rref× iPD, the resistance value of the feedback resistance Rref is set so that the voltage value Vout that is output from the amplifier ampX1 is a value from several tens of millivolts (mV) to several volts (V). A value of approximately $10^5 \Omega$ to $10^9 \Omega$ is used as the feedback resistance Rref.

Next, a method of setting the gain of the current detection unit 122 and the threshold voltage Vth of the comparison unit 123 is described. Each radiation detection sensor 121 detects radiation that was transmitted through a subject. Since the conditions of radiation irradiation differ depending on the radiographing kind such as the radiographing site and build of the subject and whether still image radiographing or moving image radiographing is performed, a radiation amount that is input to the radiation detection sensor 121 differs depending on the radiographing. Consequently, it is necessary for the radiation detection unit 120 to be configured so as to be capable of detecting radiation in a manner that corresponds to all radiation amounts that are used in radiographing.

As described above, the start of irradiation of radiation is detected if the voltage value Vout that is output from the amplifier ampX1 exceeds the threshold voltage Vth. The detection performance of the radiation detection unit 120 depends on the following points.

Noise
Time response
SN ratio

Here, the term "noise" refers to, for example, a dark current of the radiation detection sensor 121, thermal noise of the feedback resistance Rref, an input offset current of the amplifier ampX1, and an input offset voltage of the comparator CMP1 and the like. In the radiation detection unit 120 illustrated in FIG. 4, as a characteristic of these kinds of noise, a dark current of the radiation detection sensor 121 or an input offset current of the amplifier ampX1 is amplified in proportion to a gain that corresponds to the resistance value of the feedback resistance Rref. In contrast, thermal noise of the feedback resistance Rref or an input offset voltage of the comparator CMP1 is not amplified in proportion to a gain that corresponds to the resistance value of the feedback resistance Rref. That is, the noise of the radiation detection unit 120 includes noise that is amplified in proportion to a gain of the current detection unit 122 and noise that is not amplified in proportion to a gain thereof. Therefore, the entire amount of the noise of the radiation detection unit 120 is not amplified in proportion to the gain current detection unit 122.

Figure 5:
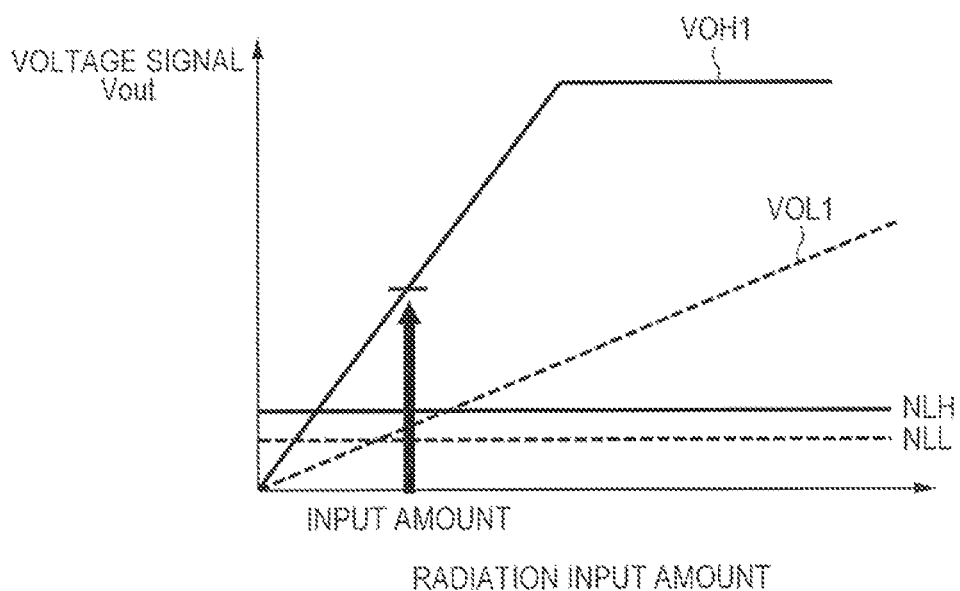
FIG. 5 is a conceptual diagram that illustrates input-output characteristics in accordance with a gain setting of a current detection unit.

FIG. 5 illustrates a conceptual diagram of two kinds of input-output characteristics for a case where a gain setting of the current detection unit 122 is low and a case where the gain setting is high. In FIG. 5, reference character VOL1 denotes the input-output characteristics when the gain setting of the current detection unit 122 is low, and reference character VOH1 denotes the input-output characteristics when the gain setting of the current detection unit 122 is high. Further, reference character NLL denotes a noise level when the gain setting of the current detection unit 122 is low, and reference character NLH denotes a noise level when the gain setting of the current detection unit 122 is high.

In a case where the radiation input amount to the radiation detection sensor 121 is small, if the gain setting of the current detection unit 122 is low, the proportion of the noise level with respect to the voltage value Vout that is output from the amplifier ampX1 is large. That is, the SN ratio is small. In contrast, if the gain setting of the current detection unit 122 is high, the proportion of the noise level is small. That is, the SN ratio is large. Accordingly, by setting the gain of the current detection unit 122 to a high value, the SN ratio at the radiation detection unit 120 can be raised. Here, the term "SN ratio" refers to a ratio obtained by dividing the voltage value Vout that is output from the amplifier ampX1 by the sum total of the noise.

However, when the gain of the current detection unit 122 is set to a high value, a time constant value of the amplifier ampX1 increases, and the time response of the voltage value Vout deteriorates. Consequently, there is a possibility that a time period from when radiation irradiation is actually started until the start of radiation irradiation is detected at the radiation detection unit 120 will increase. Further, when detecting the end of radiation also, there is a possibility that a time period from when radiation irradiation is actually ended until the end of radiation irradiation is detected will increase.

Therefore, in the present embodiment, a radiation detection sensor for which the gain of the current detection unit 122 is set to a high value to ensure a high SN ratio of the radiation detection sensor 121, and a radiation detection sensor for which the gain of the current detection unit 122 is set to a low value to prevent saturation are arranged adjacent to each other. The outputs of the two comparison units 123 that receive signals from the adjacent two radiation detection sensors 121, respectively, are connected to the determination unit 127. Therefore, the start of irradiation of radiation is detected based on the output of the comparison unit 123 whose voltage value Vout first exceeds the threshold voltage Vth among the two comparison units 123. Further, when irradiation of radiation ends, the end of the irradiation of radiation is detected based on the output of the comparison unit 123 whose voltage value Vout first becomes less than the threshold voltage Vth among the two comparison units 123. The set of adjacent radiation detection sensors 121 is arranged at the center region in the detection unit 101 so as to enable detection even in a case where the irradiation field of radiation is narrowed when performing radiographing.

FIG. 6 is a conceptual diagram illustrating an example of voltage values Vout that are output from the current detection units 122 that are connected to the two adjacent radiation detection sensors 121, respectively. In FIG. 6, reference character VOUT1 denotes an example of the voltage value Vout that is output from the current detection unit 122 in which the gain is set to a high value to ensure a high SN ratio, and reference character VOUT2 denotes an example of the voltage value Vout that is output from the current detection unit 122 in which the gain is set to a low value to prevent saturation. The start of radiation irradiation is detected when the voltage value Vout that is output from the current detection unit 122 in which the gain is set to a high value exceeds a threshold voltage LV1 (P1). Further, the end of the radiation irradiation is detected when the voltage value Vout that is output from the current detection unit 122 in which the gain is set to a low value becomes less than a threshold voltage LV2 (P2). Even when the voltage value Vout that is output from the current detection unit 122 in which the gain is set to a high value saturates and becomes a saturation level voltage LV2, the end of the irradiation of radiation can be detected based on the voltage value Vout that is output from the current detection unit 122 in which the gain is set to a low value.

FIG. 7 is a view illustrating an example of a gain setting table according to radiographing kinds. In the present embodiment, the gains of the current detection units 122 to which the adjacently arranged two radiation detection sensors 121 are connected are set based on radiation doses used for actual radiographing. Among the two radiation detection sensors 121, the gain of one of the radiation detection sensors 121 is set to a value that is high enough to enable detection of radiation even when the input amount of radiation is small. The gain of the other radiation detection sensor 121 is set to a value that is low enough to enable detection of radiation without saturating in a case where the input amount of radiation is large. For example, in the example illustrated in FIG. 7, gains are set that differ with respect to each other by about an extra digit.

The threshold voltages Vth of the comparison units 123 vary according to the gain settings of the current detection units 122. At the comparison unit 123 that receives the output from the current detection unit 122 in which the gain is set to a high value, since the amount of noise that is superimposed on the voltage value Vout that is output from the current detection unit 122 is large, the threshold voltage Vth of the comparison unit 123 is set to a high value. Further, at the comparison unit 123 that receives the output from the current detection unit 122 in which the gain is set to a low value, since the amount of noise that is superimposed on the voltage value Vout that is output from the current detection unit 122 is small, the threshold voltage Vth of the comparison unit 123 is set to a low value. The lower that the threshold voltage Vth of the comparison unit 123 is, the greater the degree to which the time required for the radiation detection unit 120 to detect the start of radiation irradiation after irradiation of radiation starts can be shortened.

According to the present embodiment, by adjacently arranging two radiation detection sensors 121 whose gain settings are made to differ from each other in the detection unit, even if the detection system of either one of the radiation detection sensors 121 saturates, the end of irradiation of radiation can be detected by the detection system of the other radiation detection sensor 121. Thus, both the start of irradiation of radiation and the end of the irradiation of radiation can be accurately detected. Note that although an example is described above in which two radiation detection sensors 121 whose gain settings are made to differ from each other are arranged adjacently, the present invention is not limited to a configuration in which a set of radiation detection sensors 121 includes only two radiation detection sensors 121, and a configuration may also be adopted in which a set includes three or more radiation detection sensors 121. In such case, the gain settings of the radiation detection sensors 121 are different to each other, and similarly to the above description, the start of irradiation of radiation and the end of the irradiation of radiation may be detected by detecting that the state of any one signal SIGA changed.

Figure 8:
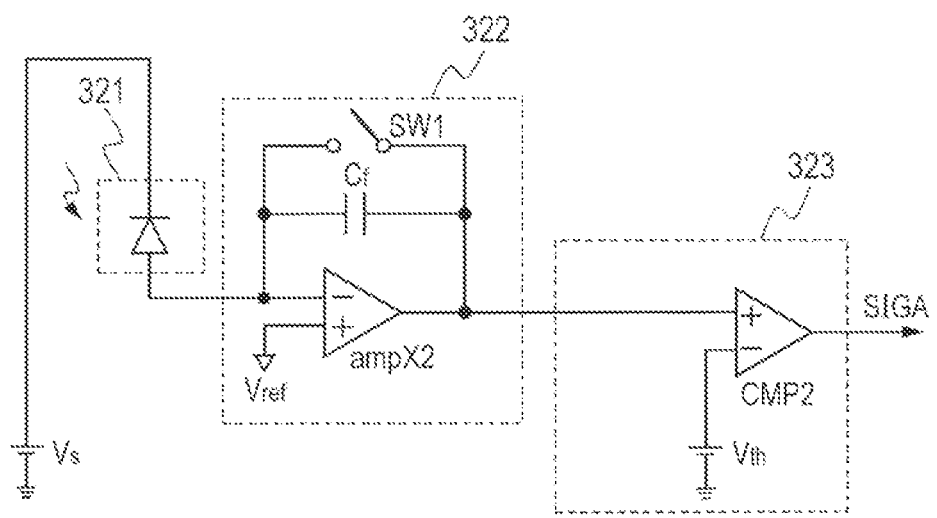
FIG. 8 is a view illustrating another configuration example of the radiation detection unit according to the first embodiment.

Although in the above description, the radiation detection sensors 121 that are arranged in the detection unit 101 are used, a configuration may also be adopted so as to detect the irradiation of radiation by providing a set of radiation detecting pixels 321 that includes two adjacent radiation detecting pixels 321 separately from the pixels for radiographing an image that are provided for acquiring image data in the detection unit 101. FIG. 8 is a view that illustrates another configuration example of the radiation detection unit 120 according to the first embodiment. The radiation detection unit 120 illustrated in FIG. 8 includes a radiation detecting pixel 321, an integrating circuit 322 and a comparison unit 323.

The radiation detecting pixel 321, for example, includes an MIS sensor that was made using a-Si. In a case where the radiation detecting pixel 321 is provided in the detection unit 101, instead of the above described gain setting of the current detection unit 122, the sensitivity of the radiation detecting pixel 321 is set. The sensitivity of the radiation detecting pixel 321 is set by means of a bias voltage value Vs. In a sensor made using a-Si, there are a large number of trap levels produced by dangling bonds because the sensor is an amorphous semiconductor, and hence the movement of electrons and holes caused by traps becomes active depending on the electric field intensity inside the semiconductor, and the sensitivity can be changed by the bias voltage value Vs.

When radiation is irradiated on the radiation detecting pixel 321, a photocharge is generated and is accumulated in a feedback capacitor Cf that is connected between an inverting input terminal and an output terminal of an amplifier ampX2 of the integrating circuit 322. Note that the reference voltage Vref is input to a non-inverting input terminal of the amplifier ampX2. A voltage value Vout that corresponds to the accumulated charge of the feedback capacitor Cf is input to a comparator CMP2 of the comparison unit 323, and compared with an arbitrary threshold voltage Vth. If the voltage value Vout exceeds the threshold voltage Vth, the comparator CMP2 sets the signal SIGA to a high level and outputs the signal SIGA. When radiation detection ends, a switch SW1 that is connected between the inverting input terminal and the output terminal of the amplifier ampX2 of the integrating circuit 322 is placed in a conductive state and the radiation detecting pixel 321 is refreshed.

In the case of using the radiation detection unit 120 illustrated in FIG. 8 also, the adjacent two radiation detecting pixels 321 include a pixel for which the sensitivity is set to a high value (the bias voltage value Vs is set to a high value) and a pixel for which the sensitivity is set to a low value (the bias voltage value Vs is set to a low value). Therefore, even if the radiation detecting pixel 321 for which the sensitivity is set to a high value saturates as the result of irradiation of radiation, the end of the irradiation of radiation can be detected by the radiation detecting pixel 321 for which the sensitivity is set to a low value. Note that as the method of setting the sensitivity of the radiation detecting pixels 321, a method may also be adopted that varies the light-receiving areas of the respective radiation detecting pixels 321. That is, the light-receiving area of the radiation detecting pixel 321 for which the sensitivity is set to a high value is made large, and the light-receiving area of the radiation detecting pixel 321 for which the sensitivity is set to a low value is made small.

Further, in the present embodiment, detection of radiation irradiation may also be performed by detecting a current that flows in the bias lines Bs of the detection unit 101. In such case, two adjacent bias lines Bs are taken as one set, and the above described current detection units 122 and comparison units 123 are connected to the two adjacent bias lines Bs, respectively. A method of determining radiation irradiation in this case is the same as the method described above.

Second Embodiment

Figure 9:
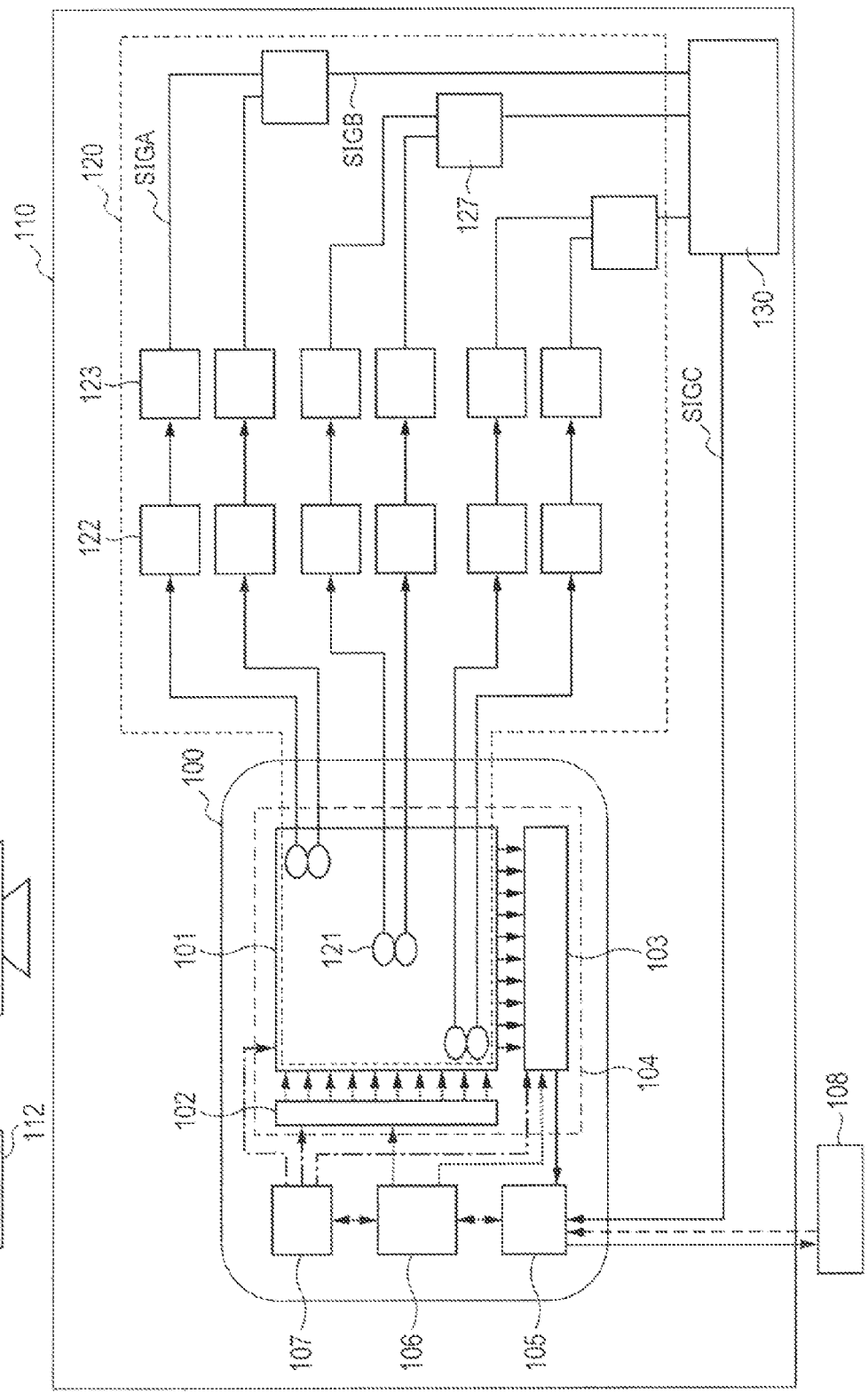
FIG. 9 is a view illustrating a configuration example of a radiation imaging apparatus according to a second embodiment.

Next, a second embodiment of the present invention will be described. FIG. 9 is a view illustrating a configuration example of a radiation imaging apparatus according to the second embodiment. Elements in FIG. 9 that have the same configuration as in the first embodiment are assigned the same reference numerals, and detailed descriptions thereof are omitted.

Differences between the second embodiment and the first embodiment are described below.

According to the second embodiment, two or more sets of radiation detection sensors 121 are arranged in the detection unit 101, with each set including two adjacently arranged radiation detection sensors 121 in which the gain settings are different to each other. At least one set of the radiation detection sensors 121 is arranged at the center part in the detection unit 101 so as to enable reliable detection of radiation irradiation even if a radiation irradiation region is narrowed. Further, the gain settings of the two or more sets of radiation detection sensors 121 may be the same or may be different to each other.

The current detection units 122 and the comparison units 123 are connected to the radiation detection sensors 121, respectively, in the manner shown in FIG. 4. A logic signal SIGA is output from the comparator CMP1 of the respective comparison units 123. Each determination unit 127 makes an OR determination with respect to signals SIGB from two comparators CMP1, and sends a radiation detection signal SIGB to the radiation determination unit 130. The radiation detection signals SIGB from the respective determination units 127 are input to the radiation determination unit 130. The radiation determination unit 130 determines the radiation irradiation state based on the radiation detection signals SIGB, and outputs the determination result by means of a radiation determination signal SIGC.

The radiation determination unit 130 may also be configured to immediately output the radiation determination signal SIGC upon input of any one radiation detection signal SIGB among the radiation detection signals SIGB from the plurality of determination units 127. In this case, since a radiation detection signal that is detected earliest among the radiation detection signals relating to the plurality of radiation detection sensors 121 is used, a time period from the start of irradiation of radiation until the irradiation of radiation is detected by the radiation detection unit 120 can be shortened. Further, the radiation determination unit 130 may also be configured to output the radiation determination signal SIGC after two or more radiation detection signals SIGB among the radiation detection signals SIGB from the plurality of determination units 127 are input. In this case, since two or more radiation detection signals are used, the occurrence of erroneous detection can be reduced and accurate radiation detection is enabled.

Figure 10:
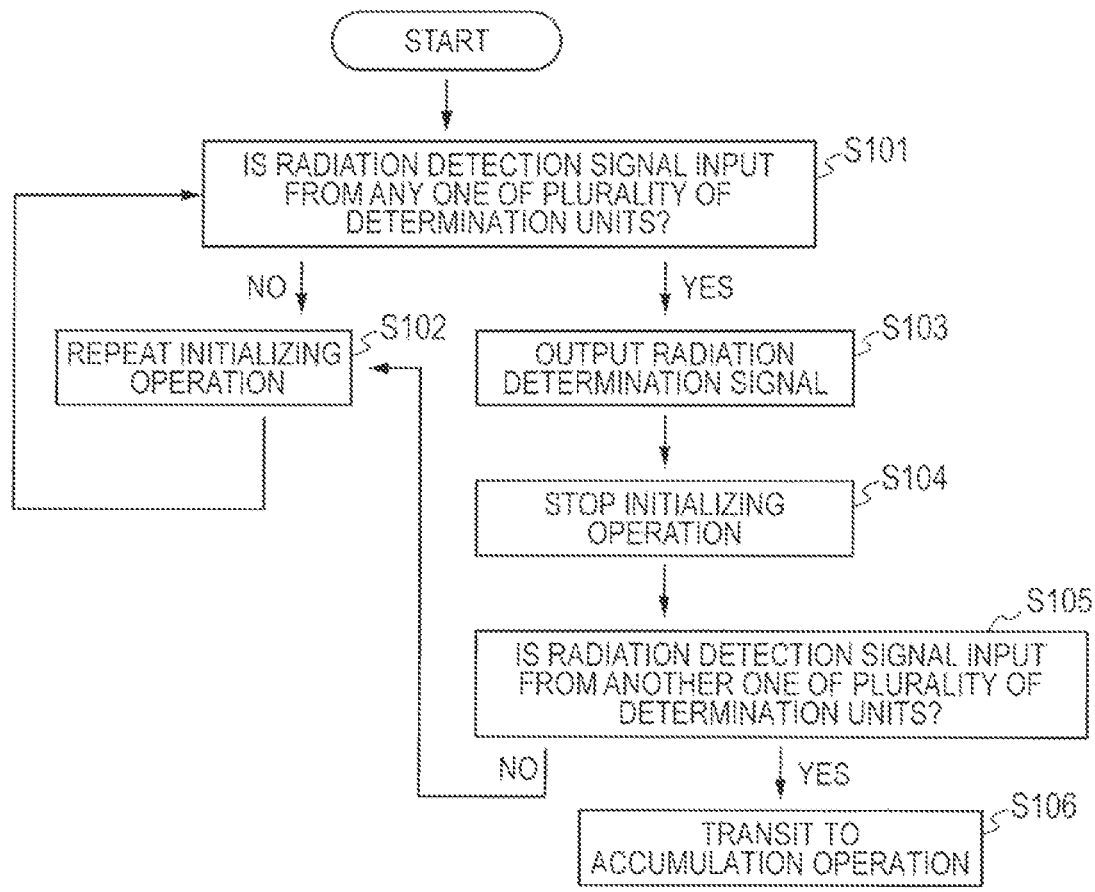
FIG. 10 is a flowchart that illustrates an example of an operation to detect radiation irradiation at the radiation imaging apparatus according to the second embodiment.

Further, a configuration may also be adopted so as to detect the start of irradiation of radiation by the following operations. FIG. 10 is a flowchart that illustrates an example of an operation to detect radiation irradiation at the radiation imaging apparatus according to the second embodiment. When the imaging apparatus 100 starts a standby operation, the radiation determination unit 130 determines whether or not any one radiation detection signal SIGB among radiation detection signals SIGB from a plurality of the determination units 127 is input in a state that indicates the start of irradiation of radiation (S101). If it is determined as a result that all of the radiation detection signals SIGB are not in a state that indicates the start of irradiation of radiation, the radiation determination unit 130 outputs a radiation determination signal SIGC that indicates that radiation irradiation is not detected to the signal processing unit 105. As a result, the imaging apparatus 100 continues the standby operation, and repeatedly performs an initializing operation (S102).

In contrast, in a case where any one of the radiation detection signals SIGB is in a state that indicates the start of irradiation of radiation, the radiation determination unit 130 outputs a radiation determination signal SIGC that indicates the start of irradiation of radiation to the signal processing unit 105 (S103). Upon receiving the radiation determination signal SIGC that indicates the start of irradiation of radiation, the signal processing unit 105 sends a signal for stopping the initializing operation to the control unit 106. As a result, the imaging apparatus 100 stops the initializing operation (S104).

Next, the radiation determination unit 130 determines whether or not another one of the radiation detection signals SIGB from the plurality of determination units 127 is input in a state that indicates the start of irradiation of radiation (S105). If it is determined as a result that another radiation detection signal SIGB is input in a state that indicates the start of irradiation of radiation, the signal processing unit 105 sends a signal for transitioning to an accumulation operation to the control unit 106. As a result, the imaging apparatus 100 transitions to the accumulation operation (S106).

On the other hand, if another one of the radiation detection signals SIGB is not input in a state that indicates the start of irradiation of radiation during a predetermined time period, the radiation determination unit 130 determines that the start of irradiation of radiation was erroneously detected. Subsequently, the radiation determination unit 130 outputs a radiation determination signal SIGC for causing the imaging apparatus 100 to resume the standby operation to the signal processing unit 105. Upon receiving the radiation determination signal SIGC, the signal processing unit 105 sends a signal for transitioning to the standby operation to the control unit 106. As a result, the imaging apparatus 100 transitions to the standby operation and resumes the initializing operation.

Thus, when any one radiation detection signal SIGB is input in a state that indicates the start of irradiation of radiation, the radiation determination unit 130 outputs a radiation determination signal SIGC that indicates the start of irradiation of radiation to temporarily stop an initializing operation of the imaging apparatus 100. Thereafter, if a second radiation detection signal SIGB in a state that indicates the start of irradiation of radiation is input to the radiation determination unit 130, the imaging apparatus 100 transitions to an accumulation operation. If a second radiation detection signal SIGB in a state that indicates the start of irradiation of radiation is not input to the radiation determination unit 130, the radiation determination unit 130 determines that there was an erroneous detection and sends a signal to the imaging apparatus 100 so as to cause the imaging apparatus 100 to resume a standby driving operation, that is, the initializing operation. It is thereby possible to reduce the occurrence of erroneous detection of the start of radiation irradiation and to also lessen the outflow of signals from the conversion elements 201 caused by an initializing operation.

According to the second embodiment, by preventing a deterioration in the accuracy of detecting the end of irradiation of radiation due to saturation of a detection system by providing two or more sets of radiation detection sensors 121 in which each set includes two adjacent radiation detection sensors 121 in which the gain settings are different to each other, and also by the determination method illustrated in FIG. 10, a radiation imaging apparatus that has high detection accuracy can be realized.

Other Embodiments

The present invention can also be realized by supplying software (a program) for realizing the functions of the above embodiments to a system or an apparatus via a network or via various storage media, and having a computer (or a central processing unit (CPU) or a micro processing unit (MPU)) of the system or apparatus read and execute the program.

It is to be understood that the foregoing embodiments are intended to merely illustrate specific examples of the present invention, and are not intended to limit the technical scope of the present invention. That is, the present invention can be implemented in various forms without departing from the technical concept or the principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192414, filed Aug. 31, 2012, which is hereby incorporated by reference herein in its entirety.

What is claimed is:

1. A radiation imaging apparatus comprising:
   a detector including a detection section in which pixels having a conversion element that converts radiation into an electric charge are arranged in a matrix, a drive circuit configured to drive the detection section to output electric signals that correspond to the electric charges from the pixels, and a read circuit configured to output the electric signals as image data;
   a radiation detection unit configured to detect an irradiation state of radiation using two detection units that are adjacently arranged in the detection section; and
   a control unit configured to control operations of the drive circuit and the read circuit in accordance with a detection result obtained by the radiation detection unit,
   wherein, in the radiation detection unit, a gain of a first one of the detection units is set lower than a gain of a second one of the detection units, and
   wherein a start of irradiation of radiation is detected by the second one of the detection units and an end of irradiation of radiation is detected by the first one of the detection units.

2. The radiation imaging apparatus according to claim 1, wherein the control unit is further configured to:
   cause an operating state of the detector to transition from a standby state in which the detector repeatedly performs resetting of the conversion elements to an accumulation state in which the detector accumulates the electric charges in the conversion elements when a start of irradiation of radiation is detected by the radiation detection unit and
   cause the operating state of the detector to transition from the accumulation state to a read state in which the detector outputs electric signals that correspond to the electric charges that are accumulated in the conversion elements when an end of irradiation of radiation is detected by the radiation detection unit.

3. The radiation imaging apparatus according to claim 1, wherein the radiation detection unit comprises:
   two radiation detection sensors that are adjacently arranged in the detection section and that are each configured to convert irradiated radiation into a current signal;
   two current detection units configured to convert the current signals from the two radiation detection sensors into respective voltage signals;
   two comparison units configured to compare the voltage signals from the two current detection units with respective threshold voltages; and
   a determination unit configured to determine an irradiation state of radiation in accordance with signals from the two comparison units,
   wherein, in a case where the voltage signals from the two current detection units exceed a threshold voltage of either one of the two comparison units, the determination unit outputs a radiation detection signal that indicates a start of irradiation of radiation, and in a case where the voltage signals from the two current detection units become less than a threshold voltage of either one of the two comparison units, the determination unit outputs a radiation detection signal that indicates an end of irradiation of radiation, and
   wherein the threshold voltage is set according to the gain of the radiation detection unit.

4. The radiation imaging apparatus according to claim 3, comprising:
   a plurality of radiation detection units each comprising two radiation detection sensors, two current detection units, two comparison units and a determination unit; and
   a radiation determination unit configured to receive radiation detection signals from each respective determination unit of the plurality of radiation detection units and determine the irradiation state of radiation,
   wherein, the radiation determination unit is configured to output a radiation determination signal that indicates a start of irradiation of radiation to the control unit when any one of the radiation detection signals that indicates a start of irradiation of radiation is input from the respective determination unit.

5. The radiation imaging apparatus according to claim 4, wherein, when any one of the radiation detection signals that indicates an end of irradiation of radiation is input from the determination unit, the radiation determination unit outputs a radiation determination signal that indicates an end of irradiation of radiation to the control unit.

6. The radiation imaging apparatus according to claim 4, wherein, when two or more of the radiation detection signals that indicate an end of irradiation of radiation are input from the determination unit, the radiation determination unit outputs a radiation determination signal that indicates an end of irradiation of radiation to the control unit.

7. The radiation imaging apparatus according to claim 3, comprising:
   a plurality of radiation detection units each comprising two radiation detection sensors, two current detection units, two comparison units and determination unit; and
   a radiation determination unit configured to receive radiation detection signals from each respective determination unit of the plurality of radiation detection units and determine an irradiation state of radiation;

wherein, the radiation determination unit is configured to output a radiation determination signal that indicates a start of irradiation of radiation to the control unit when two or more of the radiation detection signals that indicate a start of irradiation of radiation are input from the respective determination unit.

8. The radiation imaging apparatus according to claim 7, wherein, when any one of the radiation detection signals that indicates an end of irradiation of radiation is input from the determination unit, the radiation determination unit outputs a radiation determination signal that indicates an end of irradiation of radiation to the control unit.

9. The radiation imaging apparatus according to claim 7, wherein, when two or more of the radiation detection signals that indicate an end of irradiation of radiation are input from the determination unit, the radiation determination unit outputs a radiation determination signal that indicates an end of irradiation of radiation to the control unit.

10. A radiation imaging system comprising:

a radiation imaging apparatus; and a radiation generating apparatus configured to irradiate radiation, wherein the radiation imaging apparatus comprises:

a detector including a detection section in which pixels having a conversion element that converts radiation into an electric charge are arranged in a matrix, a drive circuit configured to drive the detection section to output electric signals that correspond to the electric charges from the pixels, and a read circuit configured to output the electric signals as image data;

a radiation detection unit configured to detect an irradiation state of radiation using two detection units that are adjacently arranged in the detection section; and a control unit configured to control operations of the drive circuit and the read circuit in accordance with a detection result obtained by the radiation detection unit, wherein, in the radiation detection unit, a gain of a first one of the detection units is set lower than a gain of a second one of the detection units, and wherein a start of irradiation of radiation is detected by the second one of the detection units and an end of irradiation of radiation is detected by the first one of the detection units.

* * * * *